United States Patent [19]
Schreiner et al.

[11] Patent Number: 5,609,439
[45] Date of Patent: Mar. 11, 1997

[54] METHOD OF AND APPARATUS FOR REPAIRING AND SEALING JUNCTIONS BETWEEN MAINS AND BRANCH PIPES

[75] Inventors: Herbert Schreiner, Steinheim; Hermann Suerbaum, Scheider-Schwalenberg, both of Germany

[73] Assignee: KMG Kanal-Müller-Gruppe International GmbH & Co. KG, Schieder-Schwalenberg, Germany

[21] Appl. No.: 410,800

[22] Filed: Mar. 27, 1995

Related U.S. Application Data

[63] Continuation-in-part of Ser. No. 27,516, Mar. 8, 1993, abandoned.

[30] Foreign Application Priority Data

Mar. 6, 1992 [DE] Germany ............................. 42 07 038

[51] Int. Cl.⁶ ................................................. B63B 35/03
[52] U.S. Cl. ........................... 405/154; 156/156; 264/269
[58] Field of Search ............................. 156/94, 156, 294, 156/423, 488, 493; 138/97, 98; 249/65; 264/32, 36, 268, 269, 314; 425/13, 14, 389, 392, 403; 405/154

[56] References Cited

U.S. PATENT DOCUMENTS

| | | |
|---|---|---|
| 1,348,332 | 8/1920 | Stremel . |
| 2,826,784 | 3/1958 | Pratt . |
| 3,642,975 | 2/1972 | Duggins et al. . |
| 3,937,781 | 2/1976 | Allen . |
| 5,066,208 | 11/1991 | Warmerdam . |

FOREIGN PATENT DOCUMENTS

| | | |
|---|---|---|
| 2169983 | 7/1986 | European Pat. Off. . |
| 0335223A1 | 3/1989 | European Pat. Off. . |
| 3934832C1 | 10/1989 | Germany . |
| 4022103A1 | 7/1990 | Germany . |
| 9106179 U | 5/1991 | Germany . |
| 4213898A | 11/1992 | Germany . |
| 1406736 | 3/1973 | United Kingdom . |
| WO82/04086 | 11/1982 | WIPO . |
| WO89/08218 | 9/1989 | WIPO . |

*Primary Examiner*—William P. Neuder
*Attorney, Agent, or Firm*—Darby & Darby

[57] ABSTRACT

A faulty junction between a main pipe and an entering branch pipe is repaired and sealed by using a bladder which is carried between two bearing blocks. The bladder is prepared with a resin impregnated mat, which, when the bladder is pulled and turned into a position center to a pipe junction lines and seals the pipe junction upon application of a pressure medium to the bladder. Positioning of the bladder is performed under TV remote-control.

16 Claims, 5 Drawing Sheets

METHOD OF AND APPARATUS FOR REPAIRING AND SEALING JUNCTIONS BETWEEN MAINS AND BRANCH PIPES

This is a continuation-in-part of application Ser. No. 08/027,516 filed on Mar. 8, 1993 now abandoned.

BACKGROUND OF THE INVENTION

1. Field of the Invention

The present invention relates to improvements in methods of and apparatus for repairing junctions between sewer mains and laterals. Such sewers may be sanitary systems or stormwater systems, which are both in service and buried in the ground.

2. Discussion of the Related Art

Many of such junctions have been installed in a non-professional way; laterals (i.e., branch pipes) may have been connected to mains by hammering a hole into the main. In any case such provisional made junctions/connections may be subject to exfiltration of sewage/water or infiltration of groundwater and require repair and sealing. Repairs may be done by digging down to the faulty junction to replace whatever requires to be replaced or to introduce "No-Dig" technology by doing the repair with apparatus to be introduced to the location of repair via an inspection shaft and the communicating main.

SUMMARY OF THE INVENTION

An object of the invention is to provide a simple No-Dig method by introducing an apparatus for repairing faulty pipe junctions via an inspection shaft into the main and further to the location of the faulty junction. The apparatus includes a carrier and a special bladder.

Another object of the invention is the provision of the apparatus so that it is capable of performing required repairs under supervision of TV and remote control.

A further object of the invention is the provision of materials which are applied by the apparatus and allow lasting sealing and statically firm reinstating of faulty pipe junctions. The materials also allow lasting patching of a junction area where pipe segments may be missing.

A further object of the invention is the availability of air or fluid pressure to expand and deflate the special bladder.

Still another object of the invention is the supply of a heating medium or the availability of heat generator within the apparatus for fast cure of materials used to repair the pipe junction.

In accordance with a preferred embodiment demonstrating further objects, features and advantages of the present invention, a method of and a device for internally repairing and sealing a junction of a main pipe with the end portion of a branch pipe which may enter the main pipe at a 90° angle or at any angle between 45° and 90°, comprises the steps of first making a rope connection within the sewer main between an inspection shaft X and an inspection shaft Y. The sewer main has a faulty lateral connection (i.e., junction) within the length between the two shafts. To the end of the rope which is closest to the faulty junction, an apparatus including two bearing blocks on wheels or skids (hereinafter called a carrier) with a novel bladder (disposed on the apparatus) in between the two bearing blocks is introduced into the sewer main via the inspection shaft. One bearing block has only a carrying function, the other has an electric gear engine flanged to it to turn a bladder in accordance with a location of the respective pipe-junction with the lateral. The axial ends of the bladder are provided with stub shafts which are connected to the bearing blocks. Once the bladder is positioned between the two bearing blocks, the position of the axial ends of the bladder are locked. A TV-camera is connected to the apparatus, so that the TV-camera faces the apparatus.

The apparatus and TV-camera are preferably pulled by a rope to the location where the faulty pipe junction was detected. The carrier is able to rotate the special bladder clockwise or counterclockwise in accordance with the radial position of the lateral entry. The special bladder itself is preferably not in contact with the main pipe when pulled into position in the deflated condition.

The TV-camera and the carrier having the special bladder are connected to an electrical source. The bladder is connected to a pressure source located outside and preferably above the ground. By TV-control, the longitudinal position, center to the lateral, is established and thereafter the radial position, by radial adjustment caused by the bearing block having the flanged gear engine is established.

The special bladder according to the present invention is comprised of a bladder to which a satellite bladder is connected, preferably by vulcanization when the bladders are made of rubber. The satellite bladder is located in the center of the bladder and extends, when inflated, radially outwardly with respect to the bladder. The bladder is connected and sealed at both axial ends to a metal-pipe which has a bore in the location where the satellite bladder is connected to the bladder. The bladder and satellite bladder are integrally connected, without separation, on the inside.

Once the bladder is positioned in a location of a faulty pipe junction, the bladder is inflated by pressurized air or other fluid pressure. A first pressure step radially expands the bladder until it is in full contact with the interior surface of the main pipe. A further second step of pressurizing will cause inversion of the satellite bladder, which was located within the bladder. Upon inversion of the satellite bladder in full length into the lateral, a third step of pressurizing causes the radial expansion of the satellite bladder until it is in full contact with interior surface of the lateral pipe.

The bladder is preferably designed to prevent longitudinal expansion of the bladder when under pressure.

Upon deflation of the bladder, the radial expansion of the satellite bladder and bladder will form back to their respective original diameters and by applying a vacuum to the inside of the bladder, the satellite bladder will reverse back to its original position within the bladder. Deformation of the main bladder is prevented by the interior metal pipe. A suitable way of introducing vacuum to the bladder was found by installing an ejecting device which is activated at a predetermined maximum pressure. At this point a valve opens, releasing the incoming pressurized air/fluid to the outside and causes a negative pressure condition inside the bladder.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PRESENTLY PREFERRED EXEMPLARY EMBODIMENTS

Figure 1:
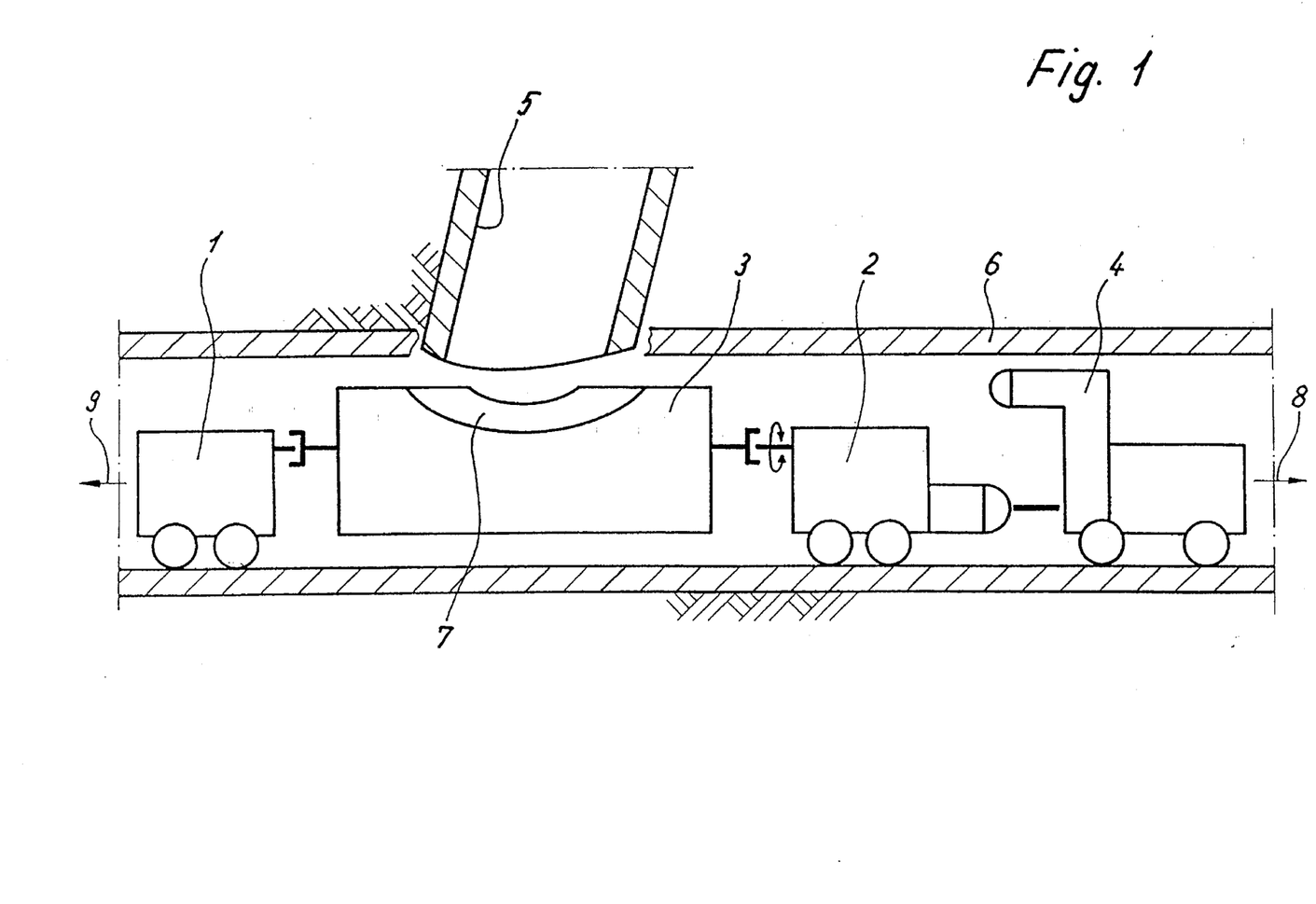
FIG. 1 shows the apparatus and TV-camera when positioned at a faulty junction between a main pipe and a branch pipe.

FIG. 1 shows a faulty pipe junction including a main pipe 6 and a lateral or branch pipe 5. A special bladder 3 is positioned center to the entry of lateral 5 and carries a resin soaked mat 7 to be pressed against the surrounding area of a lateral opening within main pipe 6 and into the front part of lateral 5 by bladder 3 which is activated by pressurized air or by another type of fluid pressure. Bladder 3 is not in contact with an interior surface of main pipe 6 while being moved into position.

Bladder 3 is connected on both axial ends to bearing blocks 1 and 2, which are both on wheels or skids. An electric gear engine is connected to bearing block 2, which allows radial turning of bladder 3 to bring the center of mat 7 in line with a center of an entering lateral pipe 5. Positioning of bladder 3 is done under remote supervision with the aid of TV-camera 4. The operation of the gear engine and the TV is achieved by remote control. Bearing block 2 and bearing block 1 in combination are together referred to as a "carrier". Additionally, bearing block 1, bearing block 2 and bladder 3 are, in combination referred to as an "apparatus".

The apparatus, which is connected with TV-camera 4, is pulled into position and removed after performance of a repair by rope 8 or rope 9. These ropes may also be, for example, cables connected to winches that are located above ground.

Figure 2:
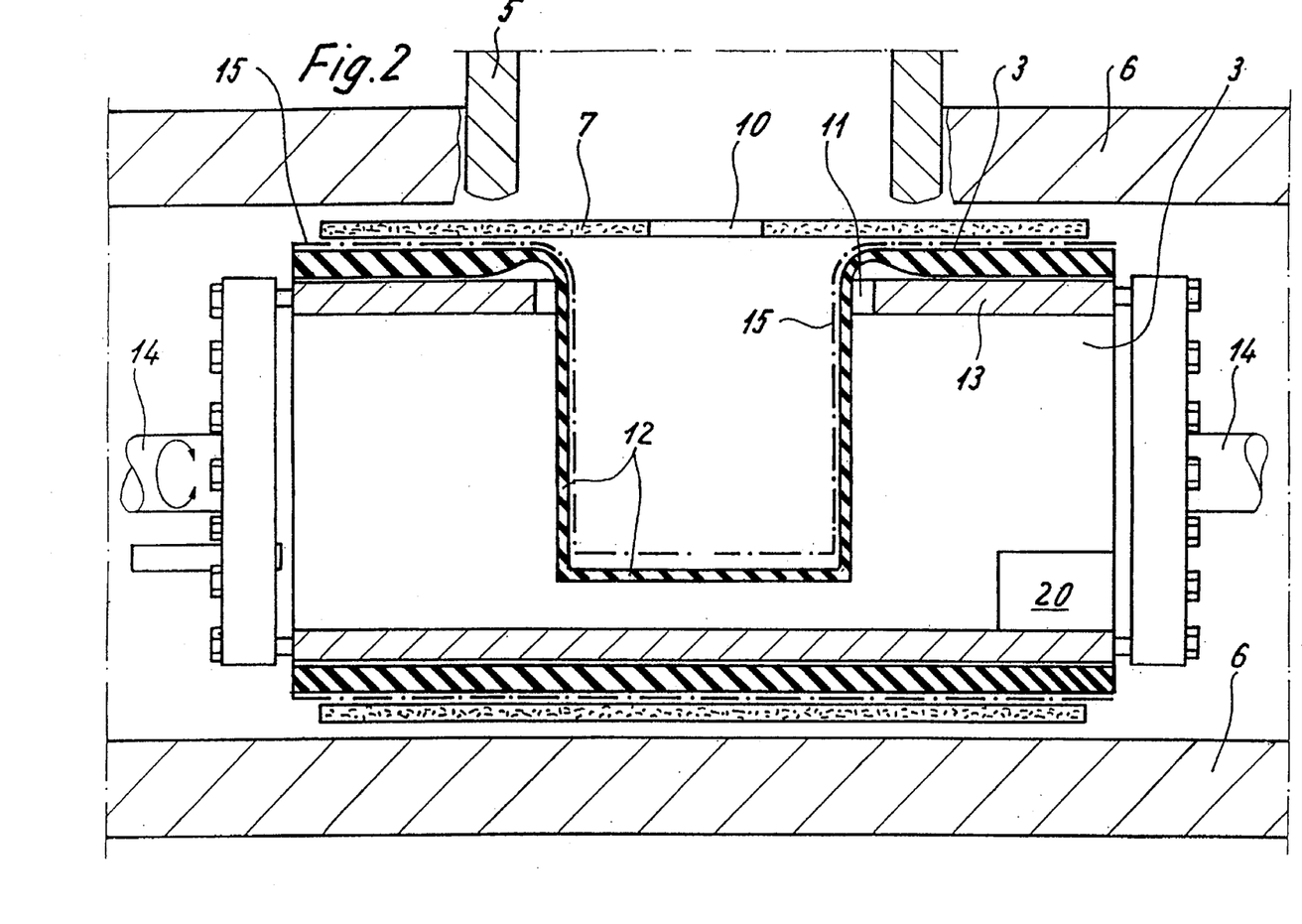
FIG. 2 is a cross-section of a deflated bladder positioned center to a branch pipe.

FIG. 2 shows a cross-section through bladder 3 according to the present invention. Bladder 3 is positioned center to the pipe junction between main pipe 6 and lateral pipe 5. Bladder 3 includes a satellite bladder 12. Both bladders 3, 12 are connected to each other by vulcanization and are preferably made of rubber. The sleeve portion of bladder 3 is connected on both axial ends to a metal pipe 13 in an airtight manner. A bore 11 is disposed in the center of pipe 13. When bladder 3 is in a deflated condition, the satellite bladder 12 is located within the center of bladder 3. At both axial ends of metal pipe 13, axle shafts 14 are provided, which are to be connected to bearing blocks 1 and 2 (not shown in FIG. 2).

Above ground, bladder 3 and satellite bladder 12 are first prepared with a polyethylene membrane 15 and thereafter with a resin soaked mat 7.

The resin soaked mat 7 has a hole 10 in its center which has a diameter of approximately 30% of the diameter of lateral 5. The polyethylene membrane (PE) 15 serves as a separator between the resin soaked mat 7 and a surface of bladder 3 and a surface of satellite bladder 12.

Figure 3:
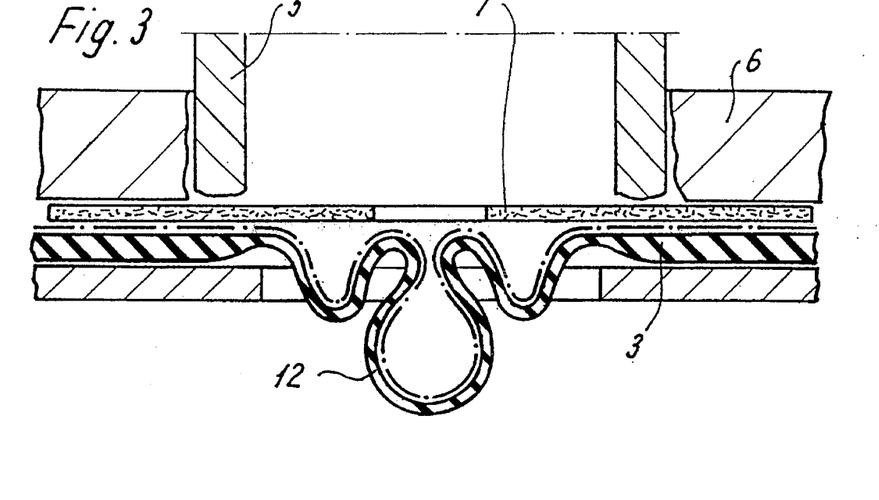
FIGS. 3–5 show cross-sections through a satellite bladder in the various stages of inversion.
Figure 4:
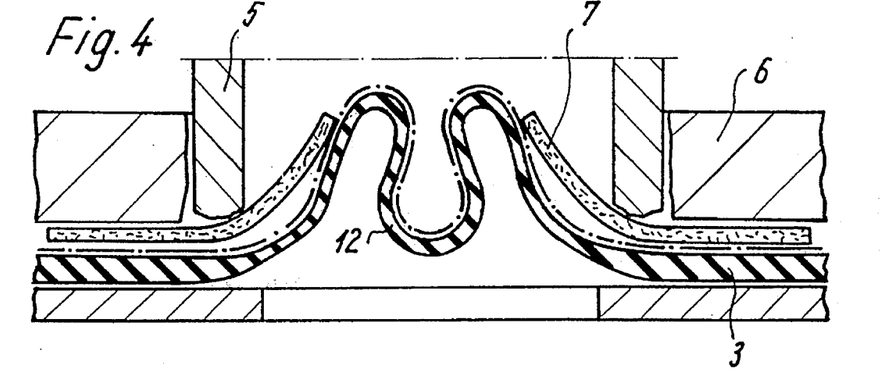

FIGS. 3 and 4 show various stages of inversion of satellite bladder 12 during a second pressure step.

Figure 5:
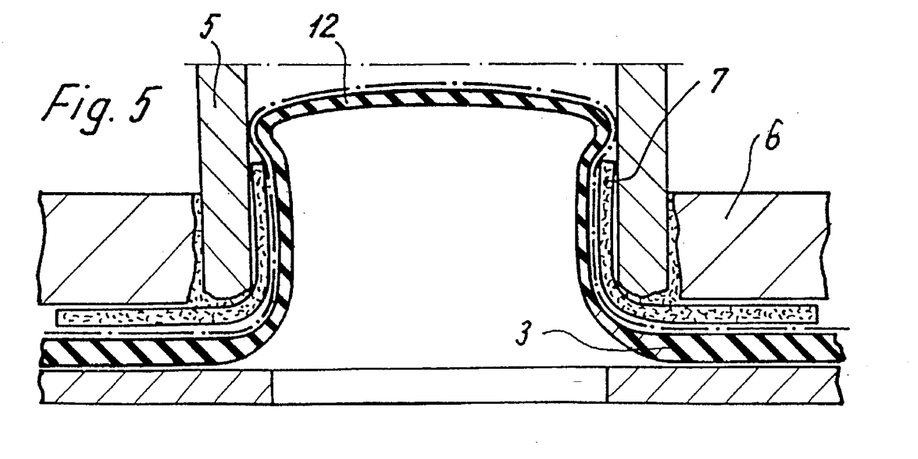

FIG. 5 shows the satellite bladder 12 during a third pressure step. The satellite bladder 12 squeezes a deformed part of resin soaked mat 7 onto the interior surface of lateral pipe 5. It should be noted that squeezing of resin soaked mat 7 against the interior surface of main pipe 6 was initiated during a first pressure step.

Figure 6:
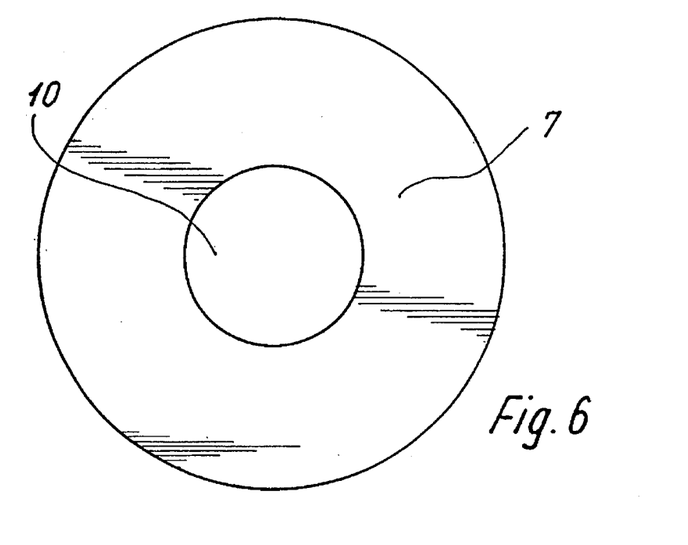
FIGS. 6, 7a and 7b show mats which are to be soaked with resin and applied to a faulty pipe junction by a bladder.

FIG. 6 shows a top and a side view of a mat 7 which when soaked with resin and applied by bladder 3, in accordance with the present invention, will form a circular collar within main pipe 6 and a cylindrical lining within the front portion of lateral pipe 5.

Figure 7A:
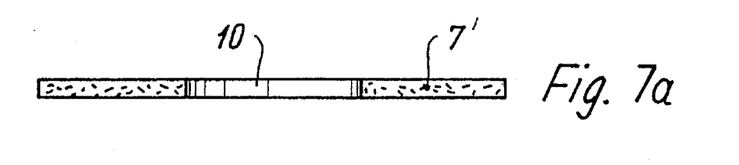
Figure 7B:
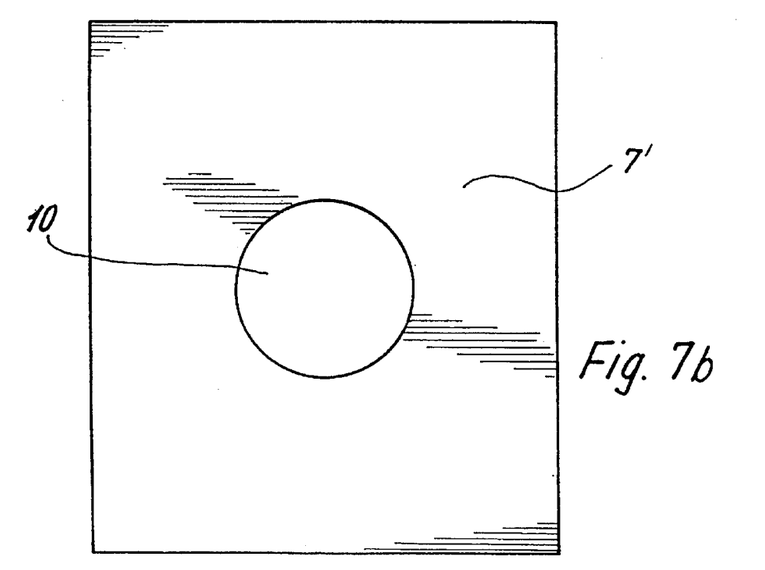

FIGS. 7a and 7b show top and side views, respectively, of another embodiment of a mat 7', which when soaked with resin and applied by bladder 3 in accordance with the present invention will form a partial lined section over the full circumference of the interior surface of main pipe 6 and a cylindrical lining within the front portion of lateral pipe 5.

Figure 8:
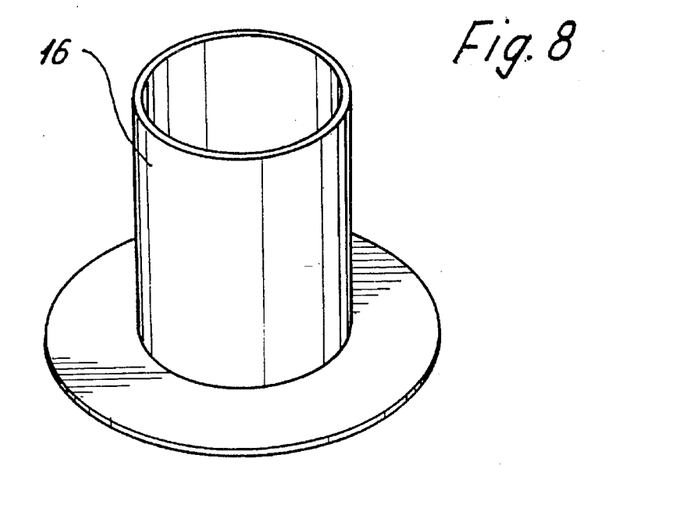
FIGS. 8 and 9 show alternative prefabricated bodies of matting material which are to be soaked with resin and applied to a faulty pipe junction by the bladder.

FIG. 8 shows a prefabricated body 16 made of resin soakable fibrous material which will form a circular collar within main pipe 6 and provides a cylindrical lining within the front portion of lateral pipe 5 when applied by bladder 3 according to the present invention.

Figure 9:
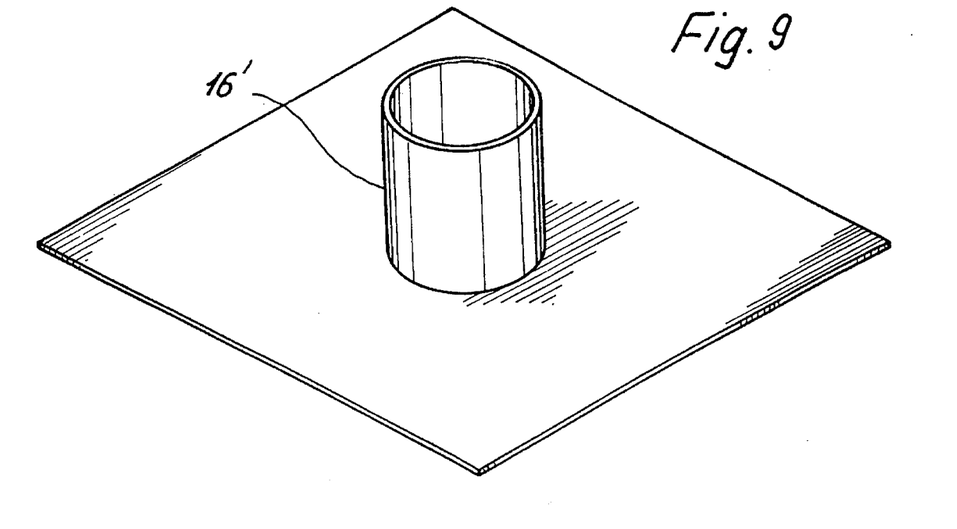

FIG. 9 shows a prefabricated body 16' made of resin soakable fibrous material which will form a partially lined section over the full circumference of the interior surface of main pipe 6 and a cylindrical lining within the front part of lateral pipe 5.

The main bladder 3 is furnished with a resin soaked prefabricated matting 7 prior to introduction into the sewer main 6. Above ground, the bladder 3, which is in a non-pressurized condition, with the satellite bladder 12 being located inside the bladder 3, is first wrapped with a thin, soft polyethylene membrane 15 allowing a fair overlap for sealing purposes. The polyethylene ("PE") membrane 15 serves as separation medium between the bladders 3, 12 and the resin soaked mat 7 described hereafter. A hole may be cut into the PE-membrane where the satellite bladder is located. The cylindrical inside of the satellite bladder 12 is prepared in the same manner (i.e., a second PE-membrane is wrapped on the cylindrical inside of the satellite bladder 12). Both the PE-membranes are connected together by using self adhesive tape. The resin soaked mat is placed in the center on the bladder. The resin soaked mat is preferably made of foam rubber, light fibrous felt or of glass wool but in any case of a material which is easy to impregnate with resin, easy to compress and easy to deform three-dimensionally. The mat has a hole in its center which has a diameter of approximately 30% of the diameter of the lateral pipe 5 entering the faulty pipe junction.

The mat 7 may be circular shaped to allow for a collar within the main pipe, or the mat 7' may be rectangular to make a full circular lining within the main pipe, as illustrated in FIGS. 7a and 7b. The resin used for impregnating the mat is preferably of an epoxy type.

A further type of matting to be impregnated may have a prefabricated three-dimensional geometry. In this case the protruding part is located within the area of the satellite bladder when resting within the bladder.

The bladder, after placing the resin soaked matting/prefabricated body to it, has no protruding part disposed on its outer circumference.

Once the apparatus is positioned center to the lateral entry (i.e., at the junction) that is in need of repair, the first pressurizing step is initiated. The circumference of the bladder expands radially thus squeezing the collar part of the resin soaked mat 7 against the interior wall of the sewer main. Thereafter pressure step 2 is applied. The satellite bladder 12 inverts from inside of the main bladder 3 into the opening of the lateral pipe 5. When the satellite bladder 12 contact with the resin soaked mat 7, the mat is deformed towards the lateral, and on further inversion, the center part of mat enters the lateral. On still further inversion, the satellite bladder enlarges the precut hole within resin soaked mat and finally passes through the hole. When satellite bladder has fully inverted, pressure step 3 is applied. In the third pressure step, the satellite bladder expands radially until it squeezes the deformed part of the resin soaked mat against the interior surface of the lateral. By the applied pressure, the resin soaked mat is compacted and the excess resin is squeezed into the faulty areas within the junction area.

The pressurized bladder stays in place until the resin has cured by itself (i.e., a cold cure) or when equipped with heat source, until the resin has cured by heat (i.e., a hot cure). Upon cure, further increase of pressure will initiate an ejector device 20. The pressurized medium escapes to the outside and negative pressure builds up inside the bladder. The main bladder 3 and satellite bladder 12 will form back to their respective original diameters and upon further rising vacuum the satellite bladder 12 will reverse back into the inside of the main bladder 3. The PE-membrane having served as separator was fixed to both ends of the bladder and is removed when the apparatus and TV-camera are pulled back to one of the inspection shafts for removal. The finished product is a smooth lining within the area of the pipe junction.

Having described the presently preferred exemplary embodiment of a new and improved method and device for repairing a faulty pipe junction, in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

What we claim is:

1. A remote controlled device for repairing a faulty pipe junction which is buried in the ground and includes a sewer main and a sewer branch entering the main, said device comprising:

a flexible rubber bladder having a first axial end and a second axial end, said bladder having means for expanding only radially when pressurized;

a metal pipe being disposed inside of said bladder, said axial ends of said bladder being airtightly connected to said metal pipe, said metal pipe having a bore disposed about the middle of an axial length of said metal pipe, a satellite bladder being connected to said bladder and being disposed adjacent to said bore, within said bladder.

2. A remote controlled device according to claim 1, further comprising an ejector device being disposed inside of said bladder, said ejector device being activated when a predetermined pressure is reached inside of said bladder to cause a release of a pressure medium from within said bladder to the outside and developing at the same time of a negative pressure inside of said bladder, causing said bladder and said satellite bladder to reform to their original radial geometries and upon further increase of vacuum the satellite bladder reverses back to its original position inside of said bladder, the bladder being prevented from collapsing under vacuum by the metal pipe.

3. A remote controlled method for repairing a faulty pipe junction which is buried in the ground and includes a sewer main and a sewer branch entering the main, said method comprising the steps of:

expanding a flexible rubber bladder having a first axial end and a second axial end, said bladder expanding only in a radial direction when pressurized, said radial expansion being restricted by an internal surface of the main pipe;

airtightly connecting the axial ends of the bladder to a metal pipe, which is disposed inside of the bladder;

the metal pipe having a bore disposed about the middle of an axial length of the metal pipe;

connecting a satellite bladder to the bladder, the satellite bladder being positioned adjacent to the bore and centered with respect to the sewer branch at the pipe junction.

4. A remote controlled method according to claim 3, wherein said satellite bladder is connected to said bladder by vulcanization.

5. A remote controlled method according to claim 4, further comprising the step of applying a first predetermined amount of pressure so that the bladder expands radially until its surface is in full contact with the internal surface of the main pipe.

6. A remote controlled method according to claim 5, further comprising the step of applying a second predetermined amount of pressure so that the satellite bladder inverts from inside of the bladder into the opening of the branch pipe, and so that the satellite bladder's diameter has not yet expanded.

7. A remote controlled method according to claim 6, further comprising the step of applying a third predetermined amount of pressure so that the satellite bladder expands radially until its surface is in full contact with an interior surface of the branch pipe.

8. A remote controlled method according to claim 7, further comprising the step of activating an ejector device, disposed inside of said bladder, at a fourth predetermined amount of pressure, so that a pressure medium inside of said bladder is released to the outside and developing substantially at the same time negative pressure inside of the bladder, causing the bladder and satellite bladder to reform to their respective original radial geometries and upon further increase of vacuum the satellite bladder will reverse back to its original position inside of the bladder, while the bladder is prevented from collapsing under vacuum by the interior metal pipe.

9. A remote controlled method according to claim 3, further comprising the step of installing a mat in said pipe junction by first, above ground placing the resin impregnated mat on the bladder, so that the center of the mat is positioned center to the satellite bladder and the mat has a hole in its center which has a diameter that is approximately 30% of the internal diameter of the branch pipe at the pipe junction, and said mat being of an easily stretchable and deformable material which, when introduced with the bladder into the pipe and located center to the pipe junction will deform in accordance with a change in the bladder geometry at the various pressure steps.

10. A remote controlled method according to claim 9, wherein at said first predetermined pressure, the portion of the resin soaked mat facing the interior surface of the main pipe is pressed against the main and branch pipe interior surfaces when the bladder diameter expands, trapping the mat in this position.

11. A remote controlled method according to claim 10, wherein at said second predetermined pressure, the inverting satellite bladder deforms the mat towards the branch pipe opening until the satellite bladder has forced its way through an enlarged hole in the center of the mat and has inverted to its full length.

12. A remote controlled method according to claim 11, wherein at said third predetermined pressure, the deformed portion of the mat within the branch pipe, is pressed against an interior surface of the branch pipe and thereafter the resin soaked mat cures.

13. A remote controlled method according to claim 12, wherein at said fourth predetermined pressure an ejector device disposed inside of the bladder is activated, the pressure medium is released to the outside and negative pressure develops inside the bladder, the radial deformation of the bladder reforms to its original size and upon further increase of vacuum the satellite bladder reverses back to the inside of the bladder, whereupon the bladder can be removed and the cured mat has formed a lining within the pipe junction area including a first part of the branch pipe entrance.

14. A remote controlled method according to claim 13, wherein said mat is a prefabricated body made of any one of foam rubber, light fibrous felt and glass wool, said prefabricated body allowing lining of longer lengths within the branch pipe.

15. A method for transporting and positioning a bladder within a pipe which is buried in the ground comprising the steps of:

connecting both axial ends of a bladder, which both have axle shafts, to a respective bearing block, said bearing blocks both being equipped with wheels or skids for easy movement when pulled within the pipe, one of the bearing blocks being equipped with an electric gear engine which allows clockwise and counter-clockwise turning of the bladder for exact radial positioning of the bladder within the pipe according to a position of an incoming branch pipe, the location of the bladder between the bearing blocks is such that no contact is made between the bladder and an interior surface of the pipe when being pulled through the pipe and being positioned at a center of the pipe junction under TV remote control.

16. A device for transporting and positioning a bladder within a pipe which is buried in the ground comprising:

a bladder having a first axial end and a second axial end, both axial ends of said bladder both have axle shafts being connected to a respective bearing block, said bearing blocks both being equipped with one of wheels and skids, one of the bearing blocks being equipped with an electric gear engine which allows clockwise and counterclockwise turning of said bladder for exact radial positioning of said bladder within said pipe according to a position of an incoming branch pipe, the location of said bladder between the bearing blocks is such that no contact is made between said bladder and an interior surface of said pipe when being pulled through the pipe and positioned at a center of the pipe junction.

* * * * *

UNITED STATES PATENT AND TRADEMARK OFFICE
CERTIFICATE OF CORRECTION

PATENT NO. : 5,609,439
DATED : March 11, 1997
INVENTOR(S) : Herbert SCHREINER et al.

It is certified that error appears in the above-indentified patent and that said Letters Patent is hereby corrected as shown below:

Title page, [75], Inventors, change "Scheider-Schwalenberg" to --Schieder-Schwalenberg--.

Signed and Sealed this

Twenty-ninth Day of July, 1997

Attest:

BRUCE LEHMAN

*Attesting Officer*  *Commissioner of Patents and Trademarks*